United States Patent
Tao et al.

(10) Patent No.: US 9,240,048 B2
(45) Date of Patent: Jan. 19, 2016

(54) DEPTH ESTIMATION USING THREE-DIMENSIONAL EPIPOLAR DATA STRUCTURES

(71) Applicant: Adobe Systems Incorporated, San Jose, CA (US)

(72) Inventors: Michael Wish Tao, Manteca, CA (US); Sunil Hadap, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 419 days.

(21) Appl. No.: 13/690,514

(22) Filed: Nov. 30, 2012

(65) Prior Publication Data

US 2014/0152647 A1    Jun. 5, 2014

(51) Int. Cl.
*G06T 7/00* (2006.01)

(52) U.S. Cl.
CPC .................................. *G06T 7/0065* (2013.01)

(58) Field of Classification Search
CPC .. G06T 7/0022–7/0038; G06T 7/0051–7/0077
USPC ................................................ 345/418–420
See application file for complete search history.

(56) References Cited

U.S. PATENT DOCUMENTS

| | | | |
|---|---|---|---|
| 5,911,035 A | 6/1999 | Tsao | |
| 8,149,268 B1 | 4/2012 | Meyers et al. | |
| 2002/0024517 A1 | 2/2002 | Yamaguchi et al. | |
| 2002/0191838 A1 | 12/2002 | Setterholm | |
| 2006/0056727 A1 | 3/2006 | Jones et al. | |
| 2010/0166256 A1 | 7/2010 | Kmiecik et al. | |
| 2012/0321172 A1 | 12/2012 | Jachalsky et al. | |
| 2013/0142415 A1* | 6/2013 | Ali et al. | 382/154 |
| 2013/0321790 A1 | 12/2013 | Kirby | |
| 2014/0016857 A1 | 1/2014 | Richards | |

OTHER PUBLICATIONS

Baker et al. "Generalizing epipolar-plane image analysis on the spatiotemporal surface." International Journal of Computer Vision 3.1 (1989): 33-49.*
Mellor et al. "Dense depth maps from epipolar images." (1996).*
Horstmeyer et al. "Flexible multimodal camera using a light field architecture." Computational Photography (ICCP), 2009 IEEE International Conference on. IEEE, 2009.*
"Epipolar (Stereo) Geometry," Retrieved From: http://www.cse.unr.edu/~bebis/CS791E/Notes/EpipolarGeometry.pdf, pp. 16.
Bishop, et al., "Full-Resolution Depth Map Estimation from an Aliased Plenoptic Light Field," ACCV, 2011, 186-200.

(Continued)

*Primary Examiner* — Ke Xiao
*Assistant Examiner* — Jed-Justin Imperial
(74) *Attorney, Agent, or Firm* — Kilpatrick Townsend & Stockton LLP

(57) ABSTRACT

Systems and methods are provided for depth map estimation using three-dimensional epipolar data structures. The image manipulation application receives image data depicting an image space from a multiple perspectives. The image manipulation application generates at least one three-dimensional epipolar data structure from the image data. The at least one three-dimensional epipolar data structure includes data describing the difference in position of at least one object between the perspectives. The at least one three-dimensional epipolar data structure corresponds to at least one region of the image space. The image manipulation application generates a depth map based on the at least one three-dimensional epipolar data structure.

20 Claims, 10 Drawing Sheets

(56) References Cited

OTHER PUBLICATIONS

Bishop, et al., "Plenoptic Depth Estimation From Multiple Aliased Views," Department of Engineering and Physical Sciences Heriot-Watt University, Edinburgh, UK, pp. 1-8.

Dansereau, et al., "Gradient-Based Depth Estimation from 4D Light Fields," Dept of Electrical and Computer Engineering, University of Calgary, Alberta, Canada, pp. 4.

Ekmekcioglu, et al., "Efficient Edge, Motion and Depth-Range Adaptive Processing for Enhancement of Multi-view Depth Map Sequences," Centre for Co. Systems Research, University of Surrey, Guildford, UK, Deutsche Telekom Laboratories, Technische Universitiit Berlin, Germany, Nov. 2009, pp. 4.

Johnston, "Learning Depth in Light Field Images," pp. 4.

Levin, et al., "Image and Depth from a Conventional Camera with a Coded Aperture," Massachusens Institute of Technology, Computer Science and Artificial Intelligence Laboratory, pp. 9.

Ng, "Digital Light Field Photography," available at http://www.lytro.com/renng-thesis.pdf, Jul. 2006, 203 pages, downloaded from the internet on Aug. 30, 2008.

First Action Interview Pilot Program Pre-Interview Communication from related U.S. Appl. No. 13/690,460 dated Apr. 1, 2015, 9 pages.

Notice of Allowance from related U.S. Appl. No. 13/690,460 dated Aug. 14, 2015, 17 pages.

\* cited by examiner

DEPTH ESTIMATION USING THREE-DIMENSIONAL EPIPOLAR DATA STRUCTURES

TECHNICAL FIELD

This disclosure relates generally to computer-implemented methods and systems and more particularly relates to depth map estimation using three-dimensional epipolar data structures.

CROSS REFERENCE TO RELATED APPLICATION

U.S. patent application Ser. No. 13/690,460, entitled "Depth Estimation Using Normalized Displacement of Image Pairs", filed on the same day as the present application and naming Michael Tao and Sunil Hadap as inventors, is incorporated by reference herein in its entirety.

BACKGROUND

Image manipulation programs are used to modify or otherwise use image content captured using a camera. For example, an image manipulation program can generate a depth map that includes information that describes distances of the surfaces of different objects in image content from a given viewpoint. A depth map can be used to generate three-dimensional image content from two or more images captured from one or more viewpoints and depicting at least some of the same objects.

For example, FIG. 1 is a modeling diagram depicting an image manipulation algorithm 20 generating a depth map 22 from input images 10a, 10b. The images 10a, 10b can include image content obtained by a camera imaging an image space from two perspectives. The difference in perspectives between images 10a, 10b causes a horizontal distance 16a between objects 12, 14 in image 10a to change to a horizontal distance 16b between objects 12, 14 in image 10b. The difference in perspectives between images 10a, 10b also causes a vertical distance 18a between objects 12, 14 in image 10a to change to a vertical distance 18b between objects 12, 14 in image 10b. The image manipulation application 20 can generate a depth map 22 using the difference between horizontal distances 16a, 16b and the difference between vertical distances 18a, 18b. The depth map 22 can describe a distance between the objects 12, 14 and a camera used to capture images 10a, 10b. The depth map 22 can be used to, for example, generate three-dimensional content using images 10a, 10b.

One existing solution for generating a depth map involves using a stereo algorithm to perform depth estimation. Stereo algorithms take two images and estimate the apparent displacement (or "disparity") of each pixel only along an x axis rather than on both an x axis and a y axis. Among other deficiencies, stereo-algorithms require epipolar geometric correction to generate depth-maps. Epipolar geometric correction involves two or more images being captured such that the two or more images are aligned in one dimension (i.e., a y axis) such that displacement occurs only in another dimension (i.e., the x axis). Manufacturing limitations of consumer light-field cameras limit the feasibility of making such calibrations.

Another existing solution for generating a depth map involves using an optical flow algorithm to perform depth estimation. An optical flow algorithm receives two images as inputs. The optical flow algorithm estimates the displacement between the two images of each pixel on both an x axis and a y axis. Among other deficiencies, the expanded search space used by optical flow algorithms (i.e., both the x and y) result in poor quality of depth estimation.

Accordingly, systems and methods are desirable for improving the accuracy of depth estimation.

SUMMARY

One embodiment involves receiving image data depicting an image space from a multiple perspectives. The embodiment further involves generating at least one three-dimensional epipolar data structure from the image data. The at least one three-dimensional epipolar data structure includes data describing a difference in position of at least one object between the perspectives. The at least one three-dimensional epipolar data structure corresponds to at least one region of the image space. The embodiment further involves generating a depth map based on the at least one three-dimensional epipolar data structure.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
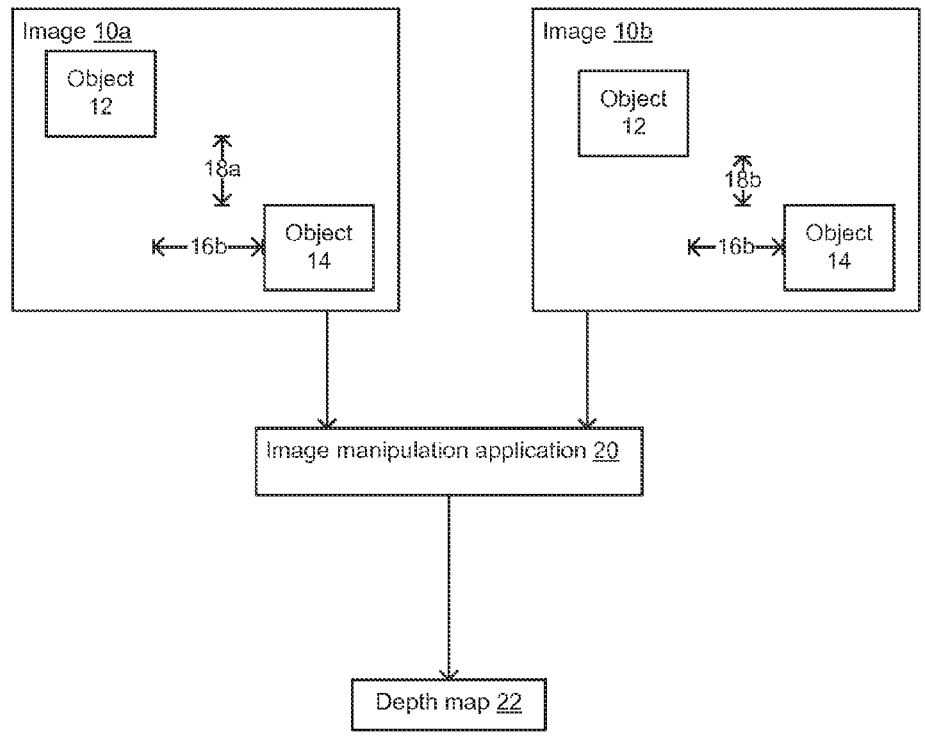
FIG. 1 is a modeling diagram depicting an image manipulation algorithm generating a depth map from input images.

Computer-implemented systems and methods are disclosed for depth map estimation using three-dimensional epipolar data structures. A three-dimensional epipolar data structure is used to represent image data of an image space that is imaged from multiple perspectives. The three-dimensional epipolar data structure can allow mathematical algorithms to be applied to image data to provide accurate and efficient depth estimation from the image data.

For example, specialized imaging devices, such as (but not limited to) a light-field camera, can capture image content from multiple perspectives. A light field camera can include an array of lenses, each of which captures a version of an image that is offset vertically and/or horizontally from a different image. For example, a light field camera can capture an image of a room that includes a table and a chair. The light field camera can capture the image of the table and chair from multiple perspectives, such as a center perspective, a left-of-center perspective horizontally offset from the center perspective, an above-center perspective vertically offset from the center perspective, etc. For each version of an image captured from a different perspective, an apparent horizontal distance and/or vertical distance between the table and the chair can differ. An image manipulation application can use the different versions of the image captured from different perspectives to generate a three-dimensional epipolar data structure. The three-dimensional epipolar data structure can be used to describe the apparent horizontal and/or vertical displacement of different objects between different versions of the image. The image manipulation application can analyze the data in the three-dimensional epipolar data structure to generate a depth map. Analyzing the data in the three-dimensional epipolar data structure to generate the depth map can obviate the need for performing a first mathematical analysis of the horizontal displacement of objects between perspectives, performing a second mathematical analysis of the vertical displacement of objects between perspectives, and combining the results of the separate mathematical analyses. Thus, the use of a three-dimensional epipolar data structure for image data can facilitate efficient depth map estimation.

In some embodiments, the image manipulation application applies a simple filter, such as (but not limited to) a second derivative filter, to estimate the depth of objects or other features in an input image. The image manipulation application can estimate the depth from the three-dimensional epipolar data structure for regions of an input image wherein the image content has increased variation in features, such as (but not limited to) the edges of objects in the image.

In accordance with one embodiment, an image manipulation application receives image data depicting an image space from a plurality of perspectives. The image data includes at least some of the same image content from different perspectives of an image space. For example, an imaging device, such as a light-field camera, can capture an input image depicting an image space, such as a room. The image of the room captured by the light-field camera includes the image taken from multiple perspectives that are offset from one another, such as a center perspective and a rightward perspective. Each version of the image from a different perspective can include one or more of the same objects in the room, such as a table and a chair. A comparison of the different perspectives can reveal an apparent difference in the positions of the table or chair from one image to the other. The image manipulation application generates at least one three-dimensional epipolar data structure from the image data. The three-dimensional epipolar data structure corresponds to at least one region of the image space, such as a portion of the room including objects such as the table and the chair. The objects may have different distances from one another in the images corresponding to the different perspectives, such as an upper perspective, a lower perspective, a leftward perspective, and a rightward perspective. A comparison of the rightward perspective image to the leftward perspective image and/or from the upper perspective to the lower perspective can reveal a difference in the apparent distance between the objects, such that the table and chair appear closer together in the rightward perspective image or the upper perspective image than the leftward perspective image or the upper perspective image. The three-dimensional epipolar data structure includes data describing the difference in position (or "displacement") of at least one object between the perspectives. For example, a three-dimensional epipolar data structure can describe the vertical displacement of the table and/or the chair from an upper perspective to a lower perspective. The three-dimensional epipolar data structure can also describe the horizontal displacement of the table and/or the chair from a left-hand perspective to a right-hand perspective. The image manipulation application generates a depth map based on the at least one three-dimensional epipolar data structure.

As used herein, the term "image content" is used to refer to any image that can be rendered for display or use at a computing system or other electronic device. Image content can include still images, video, or any combination thereof.

As used herein, the term "image space" is used to refer to a space imaged or otherwise recorded using an imaging device. An image space can be determined by a field of view for an imaging device.

As used herein, the term "imaging" is used to refer to any process or group of processes used by an imaging device to record or otherwise capture a visual representation of one or more subjects, such as the physical objects within a field of view of the imaging device.

As used herein, the term "epipolar data structure" is used to refer to a data structure for organizing data depicting, describing, or otherwise representing one or more regions of an imaged space. An epipolar data structure can describe or otherwise represent objects in an imaged space as imaged from multiple perspectives. The epipolar data structure can depict, describe, or otherwise represent the apparent displacement of an object in an image space from one perspective to another perspective. A two-dimensional epipolar data structure can depict, describe, or otherwise represent the apparent displacement of an object in a single direction using, for example, an x-y plane. A three-dimensional epipolar data structure can depict, describe, or otherwise represent the apparent displacement of an object in multiple directions using, for example, an x-y-z volume. A three-dimensional epipolar data structure can exploit a full set of light image data captured by an imaging device that using a micro-array lens.

As used herein, the term "depth map" is used to refer to data describing the distance of surfaces of objects in image content from the viewpoint of a camera or another imaging device that captures the image content.

The image manipulation application can determine an estimated depth for each pixel of the image space represented by the epipolar data structure and a confidence level associated with the estimated depth. The confidence level can represent a reliability of the depth estimation for an object in an image. A higher confidence level can be associated with regions of an image having a higher degree of variation in features, such as a region of an image that includes the edge of an object. The higher degree of variation in features for such regions corresponds to higher magnitude gradients for an epipolar data structure. A lower confidence level can be associated with regions of an image having a lower degree of variation in features, such as a region of an image that includes a mono-color surface of an object. The lower degree of variation in features for such regions corresponds to lower magnitude gradients for a two-dimensional epipolar data structure.

In some embodiments, the image data depicting different perspectives can be obtained from super-pixels captured by a light-field camera. The image manipulation application can access an input image that includes super-pixels, such as an image captured by a light-field camera. The image manipulation application can extract from the super-pixels all pixels corresponding to a center perspective and all pixels corresponding to the right-hand perspective. The image data can be obtained from a first image that includes the pixels for the center perspective and a second image that includes the pixels for the right-hand perspective.

As used herein, the term "super-pixel" is used to refer to a pixel encoding image data from multiple perspectives. A super-pixel can be generated by an imaging device that includes a micro-lens array configured to capture image content from multiple perspectives simultaneously. Each super-pixel of the image content can include a respective pixel corresponding to each perspective.

In additional or alternative embodiments, the image manipulation application can perform a regularization process for estimating the depths of image regions that have little or no variation in features. For example, an image region in which the flat surface of a table is depicted can include a mono-color surface with little or no variation in features. Imaging the mono-color surface from different perspectives may provide little or no data describing displacement of objects between the different perspectives. The image manipulation application may not be able to use image data in a three-dimensional epipolar data structure describing the image region that includes the mono-color surface to estimate or otherwise determine the depth of the image region. The image manipulation application interpolates or otherwise estimates the depth of the image region having little or no feature variation by performing a regularization process using adjacent image regions having greater feature variation. Image regions having greater feature variation, such as image regions depicting edges of objects, can be associated with higher confidence levels. Image regions having little or no feature variation can be associated with low confidence levels. A higher confidence level indicates a higher level of accuracy and/or reliability for a depth estimation of a high-confidence image region. For a low-confidence region (such as the surface of a table in an image) that is bordered by high-confidence regions (such as the edges of the table), the image manipulation application can average the depths of the high-confidence regions. The image manipulation application can assign the average depth to the low-confidence region.

As used herein, the term "regularization" is used to refer to any process or algorithm for estimating a depth of a low-confidence image region from one or more depths of one or more respective high-confidence regions.

Figure 2:
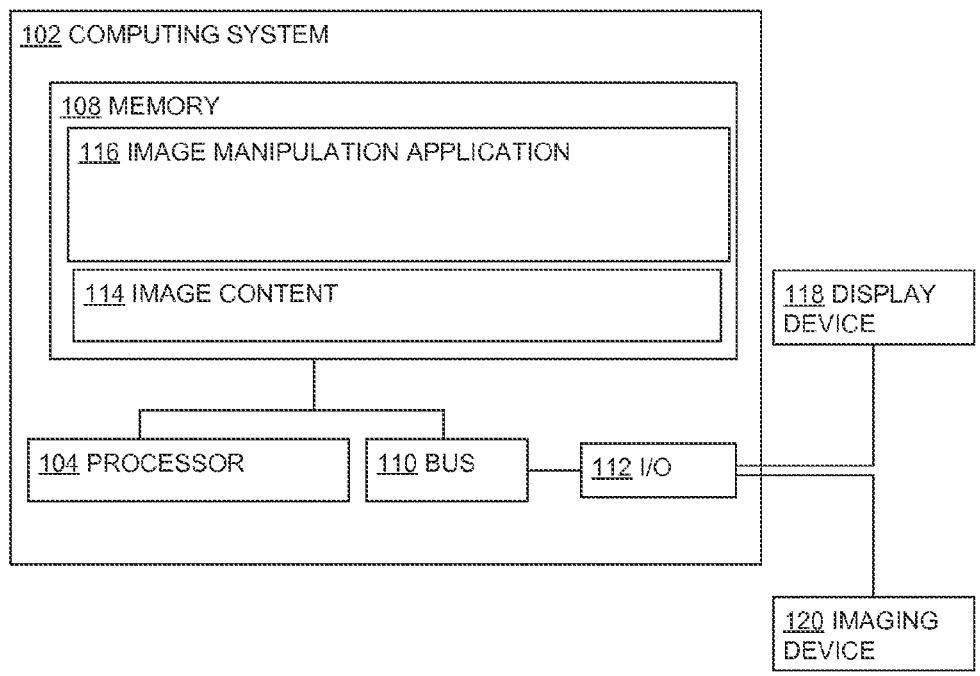
FIG. 2 is a block diagram depicting an example computing system for implementing certain embodiments.

Referring now to the drawings, FIG. 2 is a block diagram depicting an example computing system 102 for implementing certain embodiments.

The computing system 102 includes a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interface 112, a display device 118, and an imaging device 120. A bus 110 can also be included in the computing system 102. The bus 110 can communicatively couple one or more components of the computing system 102.

The computing system 102 can modify, access, or otherwise use image content 114. The image content 114 may be resident in any suitable computer-readable medium and execute on any suitable processor. In one embodiment, the image content 114 can reside in the memory 108 at the computing system 102. In another embodiment, the image content 114 can be accessed by the computing system 102 from a remote content provider via a data network.

A non-limiting example of an imaging device 120 is a camera having an energy source, such as a light emitting diode ("LED"), and an optical sensor. An imaging device 120 can include other optical components, such as an imaging lens, imaging window, an infrared filter, and an LED lens or window. In some embodiments, the imaging device 120 can be a separate device configured to communicate with the computing system 102 via the I/O interface 112. In other embodiments, the imaging device 120 can be integrated with the computing system 102. In some embodiments, the processor 104 can cause the computing system 102 to copy or transfer image content 114 from memory of the imaging device 120 to the memory 108. In other embodiments, the processor 104 can additionally or alternatively cause the computing system 102 to receive image content 114 captured by the imaging device 120 and store the image content 114 to the memory 108.

Figure 3:
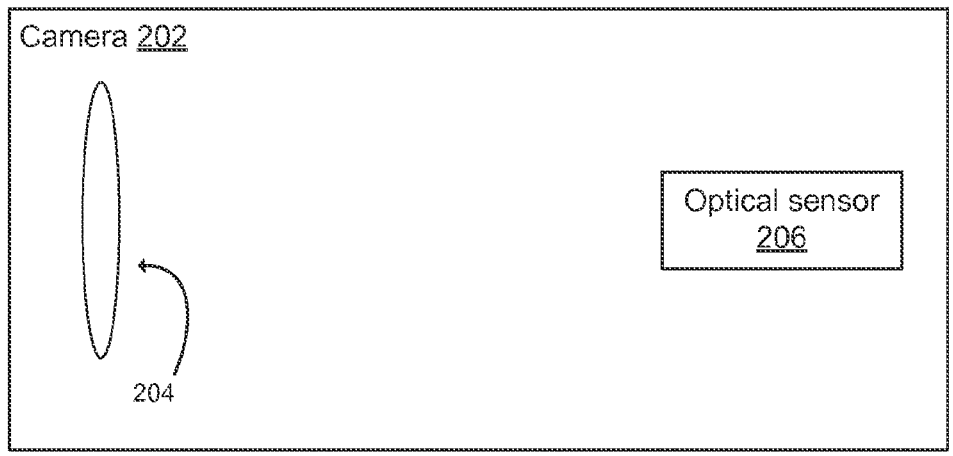
FIG. 3 is a block diagram depicting a conventional camera.
Figure 4:
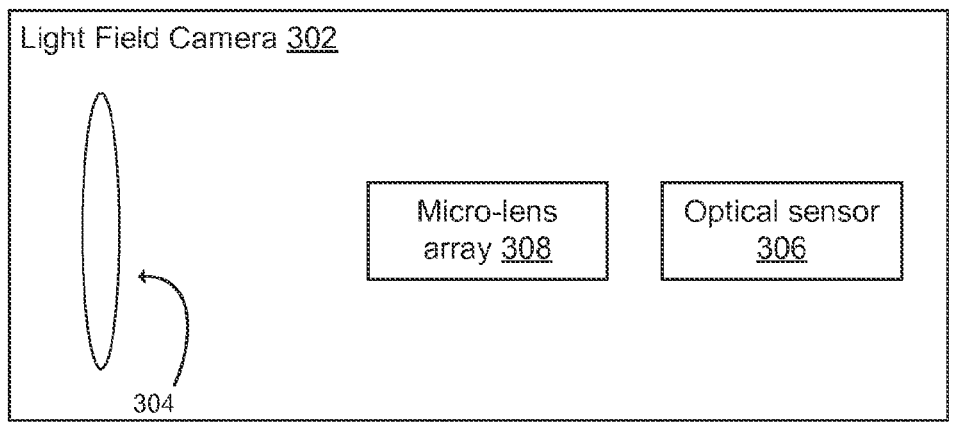
FIG. 4 is a block diagram depicting a light-field camera having a micro-lens array.
Figure 5:
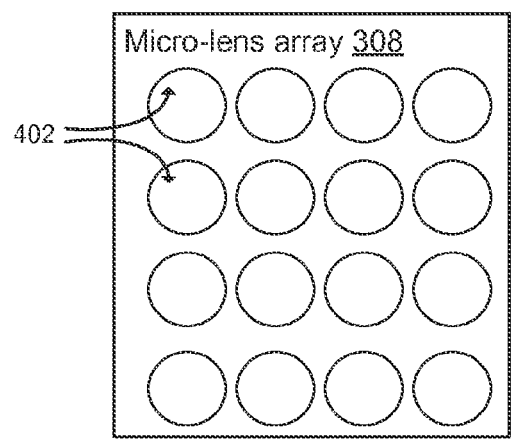
FIG. 5 is a modeling diagram depicting an micro-lens array of a light-field camera.

An imaging device 120 can be a light-field camera. FIGS. 3-5 depict a comparison between a light-field camera and a conventional camera. As depicted in FIG. 3, a conventional camera 202 can include a lens 204 positioned adjacent to a sensor 206. As depicted in FIG. 4, a light-field camera 302 can include a micro-lens array 308 positioned between a lens 304 and a sensor 306. As depicted in FIG. 5, the micro-lens array 308 can include multiple lenses 402. Each of the lenses 402 is a small lens calibrated with respect to each of the other lenses 402.

An image manipulation application 116 stored in the memory 108 can configure the processor 104 to modify, access, render, or otherwise use the image content 114 for display at the display device 118. In some embodiments, the image manipulation application 116 can be a software module included in or accessible by a separate application executed by the processor 104 that is configured to modify, access, or otherwise use the image content 114. In other embodiments, the image manipulation application 116 can be a stand-alone application executed by the processor 104.

A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing system 102 can include any suitable computing device for executing the image manipulation application 116. Non-limiting examples of a computing device include a desktop computer, a tablet computer, a smart phone, a digital camera, or any other computing device suitable for rendering the image content 114.

Figure 6:
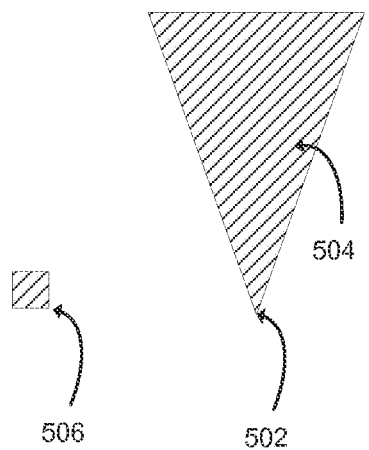
FIG. 6 is a modeling diagram depicting a conventional camera capturing an image from a single perspective.
Figure 7:
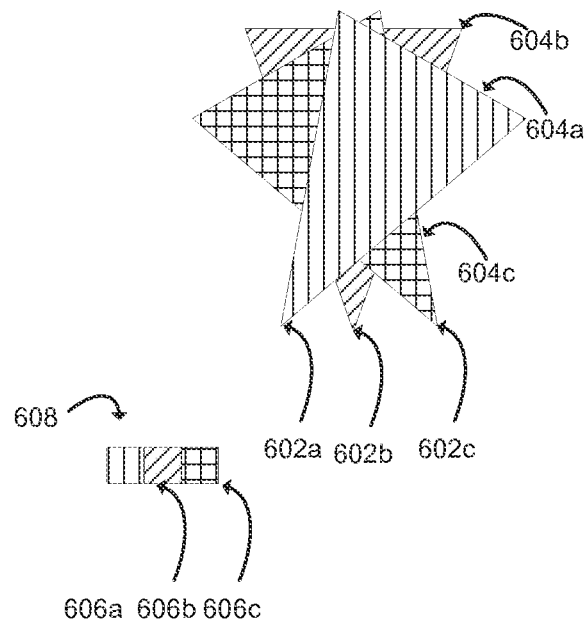
FIG. 7 is a modeling diagram depicting a light-field camera capturing an image from multiple perspectives.

An imaging device 120 that is a light-field camera 302 can provide advantages over a conventional camera 202, as depicted in FIGS. 6-7. FIG. 6 is a modeling diagram depicting a conventional camera 202 capturing an image from a single perspective 502. The conventional camera 202 can capture image content within a view 504 from the perspective 502. Each pixel 506 of the image content captured from the perspective 502 is from a single perspective.

FIG. 7 is a modeling diagram depicting a light-field camera 302 capturing an image from multiple perspectives. Each of the lenses 402 of the micro-lens array 308 can capture an image from a different perspective than one or more adjacent lenses 402. For example, as depicted in FIG. 7, a light-field camera 302 can capture image content within a left-hand view 604a from a left-hand perspective 602a, image content within a center view 604b from a center perspective 602b, and image content within a right-hand view 604c from a right-hand perspective 602c. A given portion of an image can be represented by a group of pixels providing a "super-pixel," such as a super-pixel 608. The super-pixel 608 can include, for example, pixels 606a-c of a given portion of an object captured from corresponding perspectives 602a-c.

Although FIG. 7 depicts a super-pixel having three pixels 606a-c for purposes of simplicity, a super-pixel can include any number of pixels captured by a micro-lens array 308.

Figure 8:
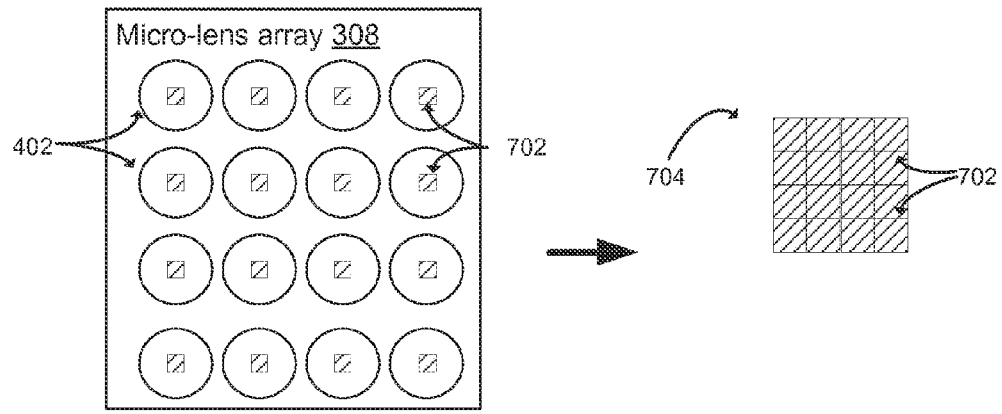
FIG. 8 is a modeling diagram depicting an image obtained by selecting center pixels from super-pixels generated by a light-field camera.
Figure 9:
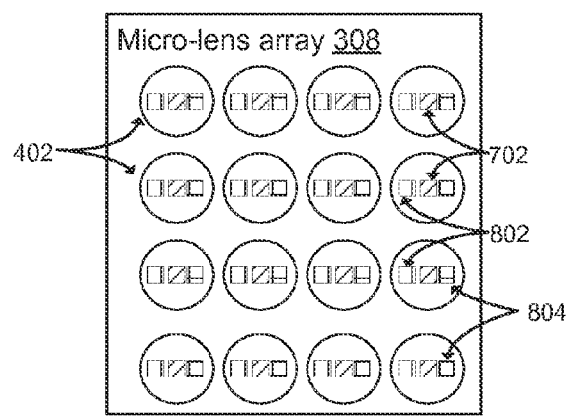
FIG. 9 is a modeling diagram depicting images obtained from different perspectives by selecting pixels representing different perspectives from super-pixels generated by a light-field camera.
Figure 9:
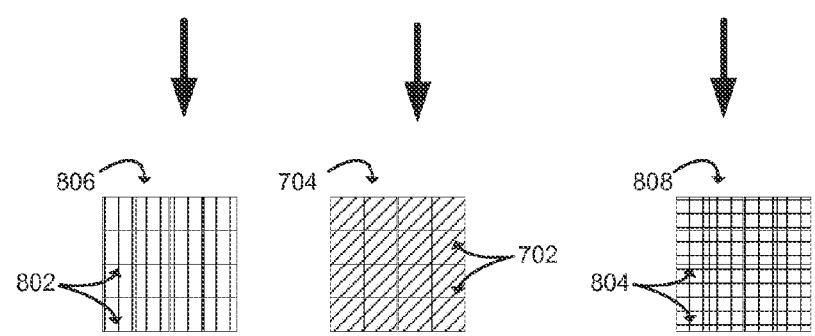
Figure 10:
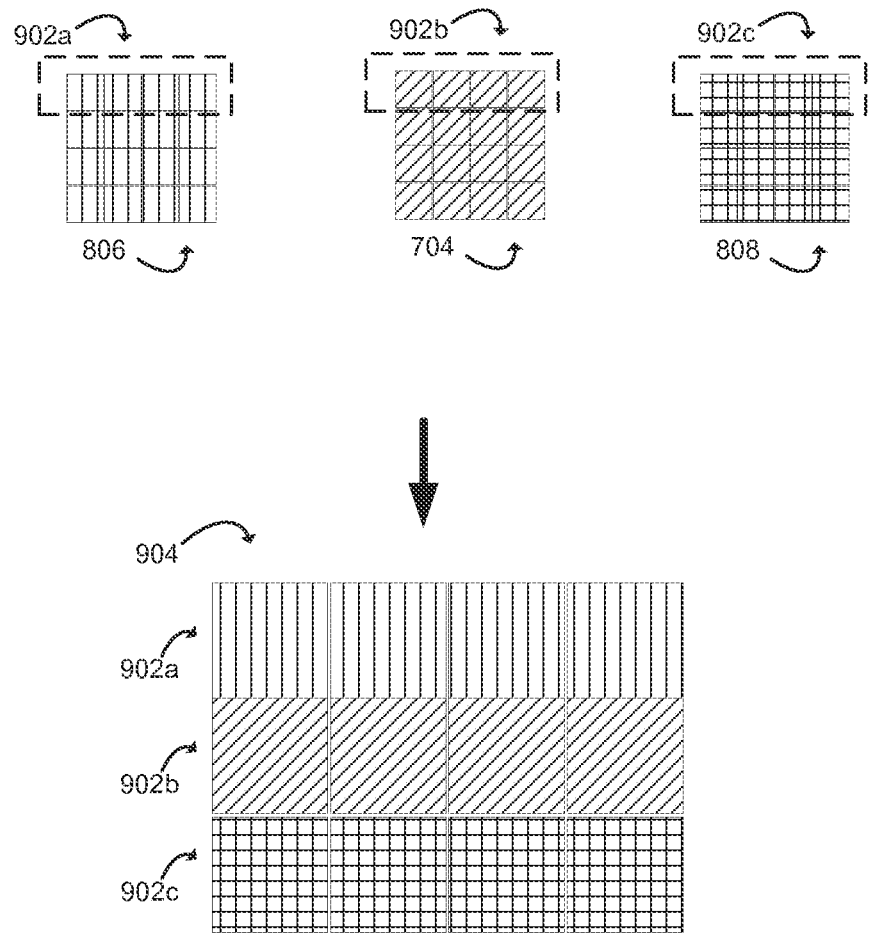
FIG. 10 is a modeling diagram depicting a two-dimensional epipolar data structure generated from images from different perspectives captured by a light-field camera.

The image manipulation application 116 can generate or otherwise images for different perspectives from super-pixels, as depicted in FIGS. 8-10. FIG. 8 is a modeling diagram depicting an image 704 obtained by selecting center pixels 702 from super-pixels generated by a light-field camera 302. The image manipulation application 116 can obtain an image 704 by selecting the center pixels 702 from each super-pixel and concatenating the center pixels 702. The image 704 can be an image captured from a center perspective 602b.

FIG. 9 is a modeling diagram depicting images obtained from different perspectives by selecting pixels representing different perspectives from super-pixels generated by a light-field camera. The image manipulation application 116 can obtain an image 806 by selecting the left-hand pixels 802 from each super-pixel and concatenating the left-hand pixels 802. The image 806 can be an image captured from a left-hand perspective 602a. The image manipulation application 116 can obtain an image 808 by selecting the right-hand pixels 804 from each super-pixel and concatenating the right-hand pixels 804. The image 808 can be an image captured from a right-hand perspective 602c. The image manipulation application 116 can obtain the three images 704, 806, 808 by selecting three different pixel locations within the super-pixels and corresponding to three different perspectives from which image content is captured by a light-field camera 302.

The image manipulation application 116 can generate a two-dimensional epipolar structure from the images 704, 806, 808. FIG. 10 is a modeling diagram depicting a two-dimensional epipolar data structure 904 generated from the images 704, 806, 808 from different perspectives captured by a light-field camera 302. The two-dimensional epipolar data structure 904 includes image information representing, depicting, or otherwise describing each perspective captured by a light-field camera 302 or other suitable imaging device 120 for a row in an image space. The image manipulation application 116 can generate a respective two-dimensional epipolar data structure for each row of an image space. The image manipulation application 116 can analyze a two-dimensional epipolar data structure to determine the displacement between different perspectives of objects or other features in an image space.

As depicted in FIG. 10, the image manipulation application 116 can concatenate rows of pixels from each of the left-hand image 806, the center image 704, and the right-hand image 808 to generate a two-dimensional epipolar data structure 904 corresponding to a respective row of the image space. For example, the image manipulation application 116 can select the top row 902a of the left-hand image 806, the top row 902b of the center image 704, and the top row 902c the right-hand image 808. The image manipulation application 116 can concatenate the rows 902a-c to generate the two-dimensional epipolar data structure 904. The row 902a from the left-hand image 806 can be the top row for the two-dimensional epipolar data structure 904. The row 902b from the center image 704 can be the middle row for the two-dimensional epipolar data structure 904. The row 902c from the right-hand image 808 can be the bottom row for the two-dimensional epipolar data structure 904. The two-dimensional epipolar data structure 904 can represent the image space corresponding to a top row of an input image.

Multiple two-dimensional epipolar data structures can be generated for corresponding rows of an image space in the same manner as depicted in FIG. 10 for the two-dimensional epipolar data structure 904 corresponding to the top row of an image space.

Figure 11:
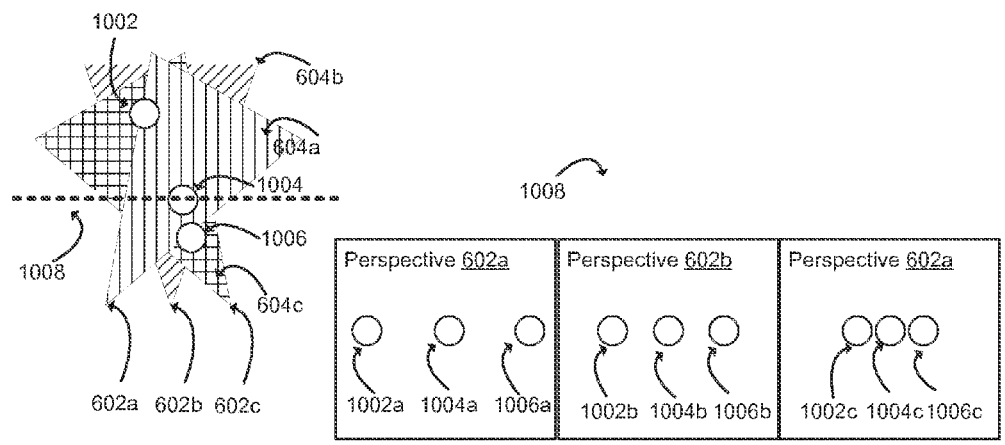
FIG. 11 is a modeling diagram depicting an apparent displacement of objects among a left-hand perspective, a center perspective, and a right-hand perspective in a focal plane.
Figure 12:
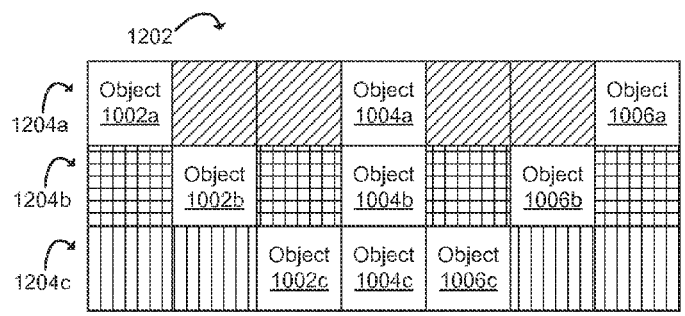
FIG. 12 is a modeling diagram depicting a two-dimensional epipolar data structure representing the apparent displacements of objects among different perspectives.
Figure 13:
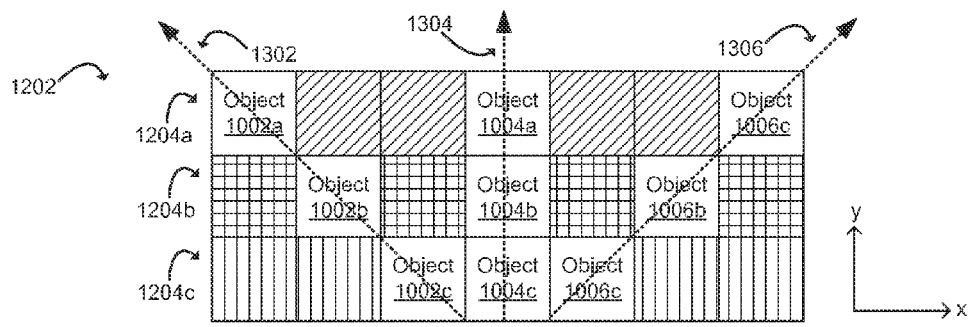
FIG. 13 is a modeling diagram depicting analysis of image data using a two-dimensional epipolar data structure.

The image manipulation application can use two-dimensional epipolar data structures to determine the displacement of objects between different perspectives of an image space, as depicted in FIGS. 11-13.

FIG. 11 is a modeling diagram depicting an apparent displacement of objects 1002, 1004, and 1006 among a left-hand perspective 602a, a center perspective 602b, and a right-hand perspective 602c in a focal plane 1008. As depicted in FIG. 11, objects in the focal plane 1008 are not vertically displaced among images corresponding to the left-hand perspective 602a, the center perspective 602b, and the right-hand perspective 602c.

Objects further from an imaging device 120 than the focal plane 1008 appear to be horizontally displaced in a first direction. For example, an object 1002 in views 604a-c of an imaging device 120 is further from the imaging device 120 than the focal plane 1008. The object 1002 is imaged by the imaging device 120 from the perspectives 602a-c as the image objects 1002a-c, respectively. The object 1002 appears displaced in a rightward direction from the left-hand perspective 602a to the right-hand perspective 602c, as depicted in FIG. 11 by the respective positions of image objects 1002a-c.

Objects positioned at the focal plane 1008 are not displaced. For example, an object 1004 in views 604a-c of an imaging device 120 is positioned at the focal plane 1008. The object 1004 is imaged by the imaging device 120 from the perspectives 602a-c as the image objects 1004a-c, respectively. The object 1004 is not displaced from the left-hand perspective 602a to the right-hand perspective 602c, as depicted in FIG. 11 by the respective positions of image objects 1004a-c.

Objects closer to an imaging device 120 than the focal plane 1008 appear to be horizontally displaced in a second direction. For example, an object 1006 in views 604a-c of an imaging device 120 is closer to the imaging device 120 than the focal plane 1008. The object 1006 is imaged by the imaging device 120 from the perspectives 602a-c as the image objects 1006a-c, respectively. The object 1006 appears displaced in a leftward direction from the left-hand perspective 602a to the right-hand perspective 602c, as depicted in FIG. 11 by the respective positions of image objects 1006a-c.

A two-dimensional epipolar data structure can be used to describe, depict, or otherwise represent the apparent displacement of objects in a single direction (e.g., a horizontal direction or a vertical direction) between perspectives. The two-dimensional epipolar data structure allows for a simplified representation of the apparent displacement of objects 1002, 1004, and 1006 among the perspectives 602a-c depicted in FIG. 11. For example, FIG. 12 is a modeling diagram depicting a two-dimensional epipolar data structure 1202 representing the apparent displacements of objects 1002, 1004, and 1006 among different perspectives 602a-c. Each row of the two-dimensional epipolar data structure 1202 corresponds to a perspective from which the image content is captured. The top row 1204a corresponds to a left-hand perspective 602a. The middle row 1204b corresponds to a center perspective 602b. The bottom row 1204c corresponds to a right-hand perspective 602c.

The position of the image objects 1002a-c, 1004a-c, and 1006a-c in the rows 1204a-c of the two-dimensional epipolar data structure 1202 corresponds to the depths of the respective objects 1002, 1004, 1006 within the imaged space. For example, the image manipulation application 116 generates a two-dimensional epipolar data structure 1202 such that each of the image objects 1004a-c are positioned at the center of the respective rows 1204a-c. The respective positions of image objects 1002a-c in the two-dimensional epipolar data structure 1202 differ from the left-hand side of the top row 1204a toward the center of the bottom row 1204c. The respective positions of image objects 1006a-c in the two-dimensional epipolar data structure 1202 differ from the right-hand side of the top row 1204a toward the center of the bottom row 1204c.

FIG. 13 is a modeling diagram depicting analysis of image data using a two-dimensional epipolar data structure 1202. The image manipulation application 116 can determine a depth of an object in an image, such as a pixel, by analyzing the data of the two-dimensional epipolar data structure. For example, the image manipulation application 116 can determine a function corresponding to a line intersecting each instance of an object in the rows of the two-dimensional epipolar data structure 1202. The two-dimensional epipolar data structure 1202 can represent image data in a two-dimensional space, as represented by the x and y axes in FIG. 13. The image manipulation application 116 can estimate a depth of each object based on a derivative of the function (i.e., the slope and direction of the line defined by the function)

For example, the image manipulation application 116 can determine the slope of a line 1302 through the image objects 1002a-c. The negative slope of the line 1302 can indicate that the object 1002 is further from the imaging device 120 than the focal plane 1008. The image manipulation application 116 can also determine the slope of a line 1304 through the image objects 1004a-c. The zero slope of the line 1304 can indicate that the object 1004 is positioned at the focal plane 1008. The image manipulation application 116 can also determine the slope of a line 1306 through the image objects 1006a-c. The positive slope of the line 1306 can indicate that the object 1006 is closer to the imaging device 120 than the focal plane 1008.

In some embodiments, the image manipulation application 116 determines the respective slopes of the lines 1302, 1304, 1306 by applying a second derivative filter to the two-dimensional epipolar data structure 1202. Applying a second derivative filter to the two-dimensional epipolar data structure 1202 can provide a derivative of the respective functions representing the lines 1302, 1304, 1306. For example, a derivative for a pixel located at position along a line defined by the function $f_{EPI}(x, y)$ in a two-dimensional epipolar data structure can be determined from the formula $$M(x, y) = \sqrt[2]{(f_{EPI}(x+1, y) - f_{EPI}(x-1, y))^2 + (f_{EPI}(x, y+1) - f_{EPI}(x, y-1))^2}$$

$$\theta(x, y) = \tan^{-1} \frac{f_{EPI}(x, y+1) - f_{EPI}(x, y-1)}{f_{EPI}(x+1, y) - f_{EPI}(x-1, y)}$$

where M represents the magnitude of the derivative and θ represents the direction of the derivative.

The image manipulation application 116 can determine an estimated depth for each pixel of the image space represented by the two-dimensional epipolar data structure 1202 and a confidence level associated with the estimated depth. The confidence level can represent a reliability of the depth estimation for an object in an image. A higher confidence level can be associated with regions of an image having a higher degree of variation in features, such as a region of an image that includes the edge of an object. The higher degree of variation in features for such regions corresponds to higher magnitude gradients for a two-dimensional epipolar data structure 1202. A lower confidence level can be associated with regions of an image having a lower degree of variation in features, such as a region of an image that includes a mono-color surface of an object. The lower degree of variation in features for such regions corresponds to lower magnitude gradients for a two-dimensional epipolar data structure 1202.

For example, the image manipulation application 116 can estimate depths and confidence levels using the magnitude M and the direction θ for a line through a given pixel of an input image. The depth of the pixel is estimated based on the direction θ. The confidence level for a depth estimation map is determined by comparing the magnitude M of the pixel to a constant threshold. If M is greater than the threshold, a high confidence is associated with the depth estimation. If M is less than the threshold, a low confidence is associated with the depth estimation. Pixels of features such as edges and textures can provide a depth estimation associated with a higher confidence level.

In additional or alternative embodiments, the image manipulation application 116 can use other suitable algorithms to estimate a depth of an object in an imaged spaced based on the relationship between objects in different rows of an epipolar data structure. A non-limiting example of a suitable algorithm for estimating depth from an epipolar data structure is a structure tensor algorithm. A structure tensor algorithm can be used to determine the magnitude M and the direction θ for a line through a given pixel of an input image. For example, a structure tensor J can determine the direction of lines in an epipolar plane image $S=S_{y^*,t^*}$. A formula for a structure tensor J is:

$$J = \begin{bmatrix} G_\sigma * (S_x S_x) & G_\sigma * (S_x S_y) \\ G_\sigma * (S_x S_y) & G_\sigma * (S_y S_y) \end{bmatrix} = \begin{bmatrix} J_{xx} & J_{xy} \\ J_{xy} & J_{yy} \end{bmatrix}$$

where $G_\sigma$ represents a Gaussian smoothing operator at an outer scale σ and $S_x S_y$ represents gradient components of S calculated on an inner scale ρ. The direction $n_{y^*,t^*}$ of local level lines can be computed from the formula $$n_{y^*,t^*} = \begin{bmatrix} J_{yy} - J_{xx} \\ 2 J_{xy} \end{bmatrix} = \begin{bmatrix} \Delta x \\ \Delta y \end{bmatrix}$$

where Δx represents a change in along the x axis and Δy represents a change along the y axis.

The image manipulation application 116 can generate a three-dimensional epipolar data structure from data encoded in a super-pixel describing multiple perspectives. A three-dimensional epipolar data structure can be used to describe the apparent displacement of objects in a multiple directions (e.g., a horizontal direction and a vertical direction) between perspectives. The image manipulation application 116 can generate a three-dimensional epipolar data structure by using images from multiple perspectives in a first direction, such as the perspectives 602a-c in a horizontal direction, and images from multiple perspectives in a second direction, such as perspectives from a top, center, and bottom viewpoint.

Figure 14:
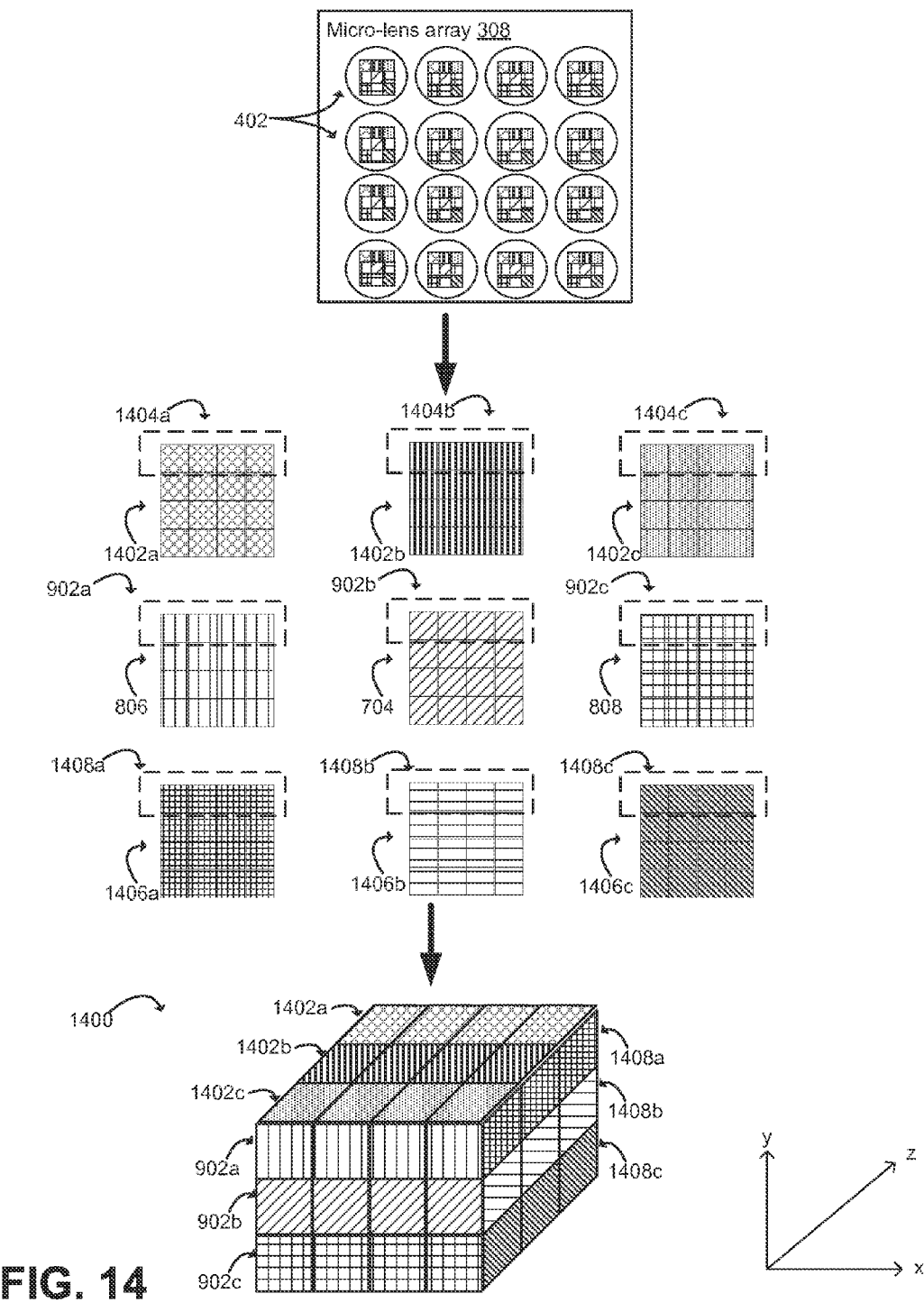
FIG. 14 is a modeling diagram depicting a three-dimensional epipolar structure 1400 generated from images obtained from different perspectives.

FIG. 14 is a modeling diagram depicting a three-dimensional epipolar structure 1400 generated from images obtained from different perspectives. For example, images 1402a-c can be obtained by respectively concatenating the upper-left pixels, upper-center pixels, and upper-right pixels extracted from super-pixels captured by a micro-lens array 308. Images 704, 806, 808 can be obtained as described above with respect to FIG. 10. Images 1406a-c can be obtained by respectively concatenating the lower-left pixels, lower-center pixels, and lower-right pixels extracted from super-pixels captured by a micro-lens array 308.

The three-dimensional epipolar data structure 1400 can represent image data in a three-dimensional space, as represented by the x, y, and z axes in FIG. 14. The image manipulation application 116 can concatenate rows 902a-c of the respective images 806, 704, and 808 to represent image data in an x-y plane of a three-dimensional epipolar data structure 1400. The image manipulation application 116 can concatenate rows 1404a-c of the respective images 1402a-c to represent image data in a y-z plane of a three-dimensional epipolar data structure 1400. The image manipulation application 116 can concatenate rows 1404a-c of the respective images 1402a-c to represent image data in a y-z plane of a three-dimensional epipolar data structure 1400. The image manipulation application 116 can concatenate rows 1408a-c of the respective images 1406a-c to represent image data in an x-z plane of a three-dimensional epipolar data structure 1400.

Figure 15:
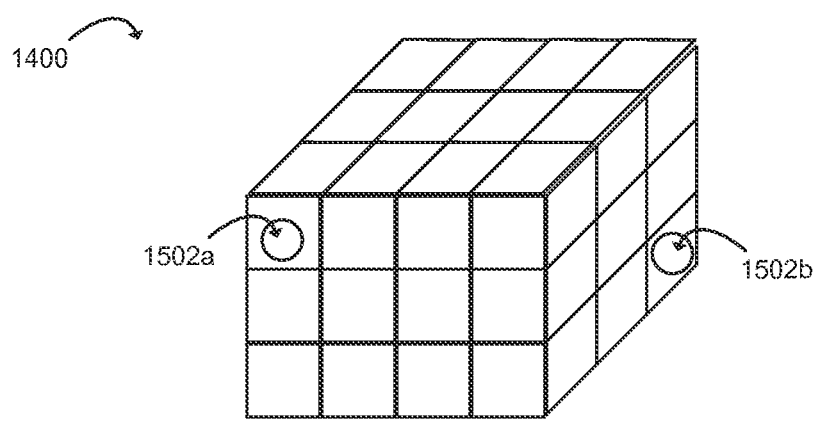
FIG. 15 is a modeling diagram depicting the apparent displacement of an object in an image space represented by a three-dimensional epipolar data structure.
Figure 16:
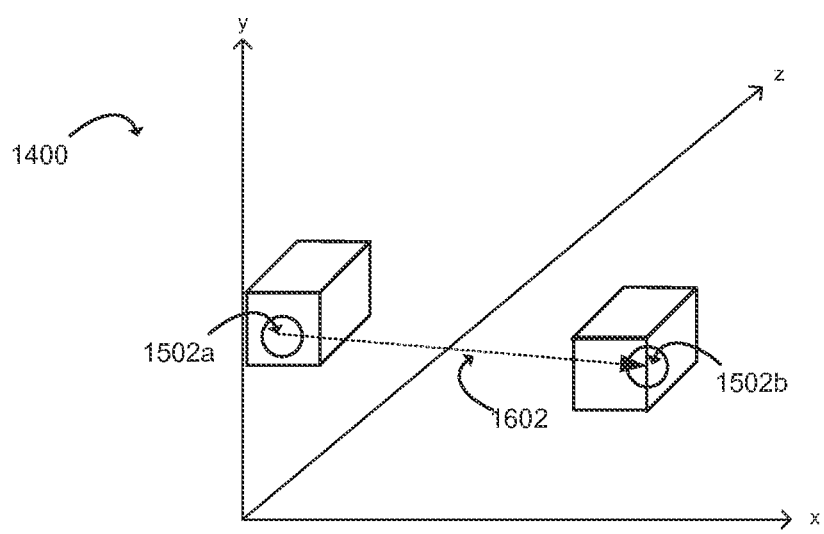
FIG. 16 is a modeling diagram depicting the apparent displacement of an object in an image space represented by a three-dimensional epipolar data structure.

FIGS. 15 and 16 are modeling diagrams depicting the apparent displacement of an object in an image space represented by a three-dimensional epipolar data structure 1400. As depicted in FIG. 15, an object in an image space can be imaged by an imaging device 120 as image object 1502a from a first perspective and an image object 1502b from a second perspective. The relative positions of image objects 1502a, 1502b in the three-dimensional epipolar data structure 1400 represent the apparent horizontal displacement and vertical displacement of the object from the first perspective to the second perspective. Although, for the sake of simplicity, FIGS. 15 and 16 depict only two image objects 1502a, 1502b representing an object imaged from two perspectives, a three-dimensional epipolar data structure can include image data for any number of objects representing an object in an image space that is imaged from any number of perspectives.

The image manipulation application 116 can analyze a function corresponding to a line 1602 connecting the image objects 1502a, 1502b as depicted in FIG. 16 in a manner similar to the analysis described above with respect to FIG. 15. The image manipulation application 116 can estimate a depth from the gradient (i.e., direction) of the line 1602. The image manipulation application 116 can determine a confidence level associated with the depth from the magnitude (i.e., length) of the line 1602.

In additional or alternative embodiments, the image manipulation application 116 can normalize angles between image pairs in the three-dimensional epipolar data structure 1400. The complexity of comparing the apparent displacement of objects in the three-dimensional epipolar data structure 1400 between image pairs can be reduced by normalizing the orientation of the various image pairs. The image manipulation application 116 can perform angle normalization using super-pixel information. Angle normalization includes transforming the orientation of an image pair such that the image pair is oriented in the same direction as a reference direction. Normalizing each image pair such that all of the image pairs have a common reference direction can allow the image manipulation algorithm to determine the displacement in the common reference direction. Determining the displacement in a single direction can improve the accuracy of a depth map determined using the displacement between image pairs. The image manipulation application 116 can generate a normalized version of each other image pair using cosine and sine data with respect to the angle between the first image pair and each other image pair. The image manipulation application 116 can normalize a displacement vector (x, y) describing the displacement between an image pair in an x-y plane to obtain a normalized displacement vector $(x_{normalized}, y_{normalized}) = (x \cos(\theta), y \sin(\theta))$.

Any suitable mathematical algorithm can be used for analyzing a three-dimensional epipolar data structure and determining the magnitude and direction of change between an object at one point in the three-dimensional epipolar data structure and another point in the three-dimensional epipolar data structure.

Using a three-dimensional epipolar data structure can allow for determining the apparent displacement in multiple of an object between different perspectives using a single data structure. Using a three-dimensional epipolar data structure can obviate the need to determine an apparent horizontal displacement of an object using a first slice, determine an apparent vertical displacement of the object using a second slice, and combining the results of the separate mathematical analyses.

In additional or alternative embodiments, the image manipulation application 116 can perform regularization to determine estimated depths of features with little or no horizontal or vertical disparity, such as a white wall. Performing regularization can include accessing a confidence map and a depth map associated with image content for an image space. A confidence map can describe confidence levels for different regions of the image content. For example, a region including a feature such as an edge is associated with a higher confidence level in a confidence map. A feature such as a smooth region without variation in an input image can be associated with a lower confidence.

The image manipulation application 116 can analyze each pixel associated with a low confidence level. The image manipulation application 116 can access the confidence levels for neighboring pixels. For neighboring pixels having a sufficient confidence level, the image manipulation application 116 can average the depth values respectively associated with the neighboring pixels. The image manipulation application 116 can set the estimated depth for the low-confidence region in the depth map to the average depth value.

In additional or alternative embodiments, other suitable algorithms can be used for estimating depth values for image regions associated with low confidence values. In one non-limiting example, a Markov random field algorithm can be used to generate depth values for pixels associated with low confidence levels.

A non-limiting example of a Markov Random Field algorithm generates a depth map based on the a confidence map determined from the magnitude M and a direction θ. The direction θ can be computed at regions in an image with texture or edges. An Markov Random Field algorithm can be performed iteratively. For each pixel, the image manipulation application analyzes the neighboring eight pixels. The image manipulation application computes a weighted average of the confidences of the neighboring pixels to determine a confidence for the pixel and a weighted average of the depths of the neighboring pixels.

For example, a confidence C of a pixel at position (x, y) can be determined from the function:

$$C(x, y) = \frac{[C(y-1, y-1)*C(y-1, y-1) + C(x, y-1)* C(x, y-1) + C(x+1, y-1)*C(x+1, y-1) + ...]}{[C(y-1, x-1) + C(x, y-1) + C(x+1, y-1) + ... ]}$$

A depth D of a pixel at position (x, y) can be determined from the function:

$$D(x, y) = \frac{[D(x-1, y-1)*C(x-1, y-1) + D(x, y-1)* C(x, y-1) + D(x+1, y-1)*C(x+1, y-1) + ...]}{[C(x-1, y-1) + C(x, y-1) + C(x+1, y-1) + ... ]}.$$

The image manipulation application can iteratively execute a Markov Random Field algorithm to interpolate values for low-confidence regions. The image manipulation application can also provide an edge-preserving function by incorporating color information, such as Red-Green-Blue ("RGB") information into the confidence calculation. For example, if a neighboring pixel at position (x, y+1) has a different color from an analyzed pixel at position (x, y), the image manipulation application can assign a low confidence to the neighboring pixel such that the averaging is not be influenced by a neighboring pixel that has a different color. If a neighboring pixel at position (x, y+1) has a color similar to an analyzed pixel at position (x, y), the image manipulation application can assign a high confidence to the neighboring pixel.

An example of a confidence C of a neighboring pixel at position (x, y+1) using RGB color information is provided by the formula:

$$C(x,y+1) = C(x,y+1)*(1-\text{color\_difference}),$$

where the color_difference between a pixel at position (x, y) and a neighboring pixel (x, y+1) is provided by the formula $$\text{color\_difference}((x, y), (x, y+1)) = \sqrt[2]{\frac{(R(x, y) - R(x, y+1))^2 + (G(x, y) - G(x, y+1))^2 + (B(x, y) - B(x, y+1))^2}{3}}$$

Figure 17:
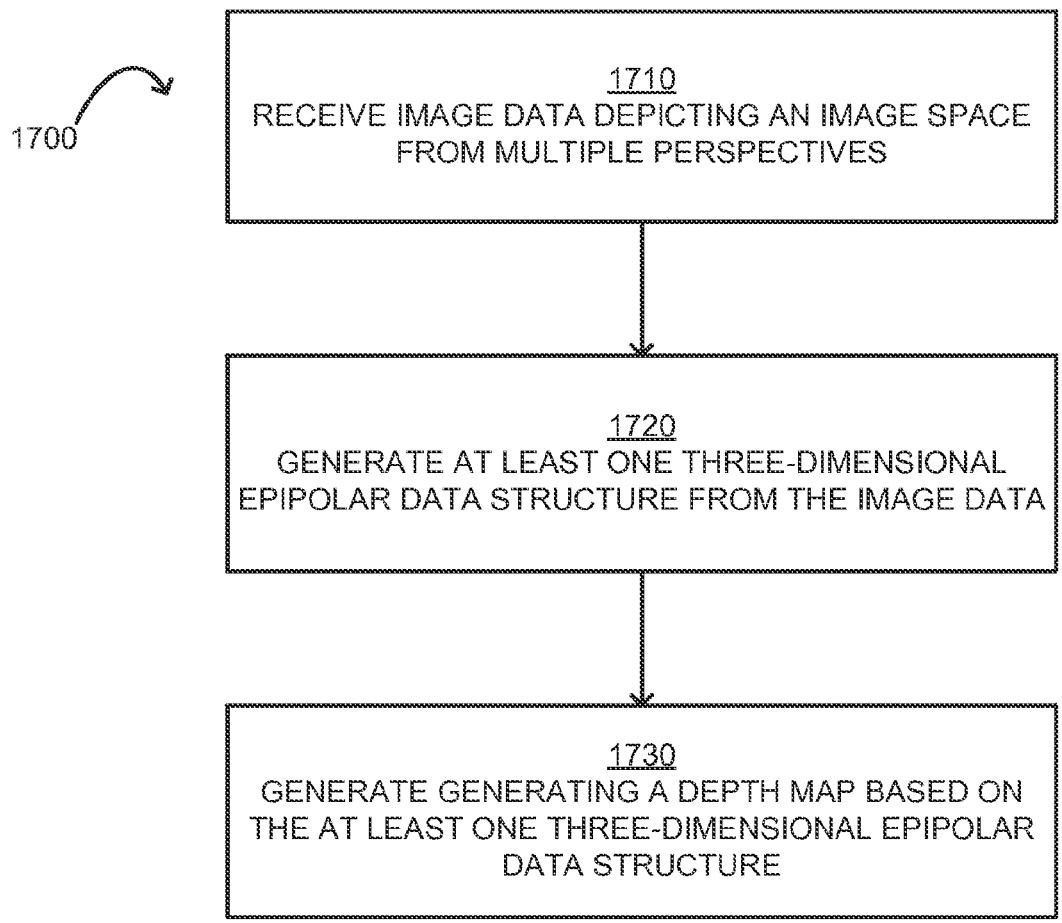
FIG. 17 is a flow chart illustrating an example method for performing depth map estimation using three-dimensional epipolar data structures.

FIG. 17 is a flow chart illustrating an example method 1700 for performing depth map estimation using three-dimensional epipolar data structures. For illustrative purposes, the method 1700 is described with reference to the system implementation depicted in FIG. 2. Other implementations, however, are possible.

The method 1700 involves receiving image data depicting an image space from multiple perspectives, as shown in block 1710. The processor 104 of the computing system 102 can execute the image manipulation application 116 to receive the image data. For example, the image manipulation application 116 can access an input image captured by an imaging device 120 such as a light-field camera 302. The input image can include super-pixels. The image manipulation application 116 can extract image data for at least two perspectives.

The method 1700 further involves generating at least one three-dimensional epipolar data structure from the image data, as shown in block 1720. The three-dimensional epipolar data structure corresponds to at least one region of the image space. The three-dimensional epipolar data structure includes data describing the displacement of at least one object between the perspectives, as described above with respect to FIGS. 13-16. The processor 104 of the computing system 102 can execute the image manipulation application 116 to generate the three-dimensional epipolar data structure, as described above with respect to FIGS. 9-16.

The method 1700 further involves generating a depth map based on the at least one three-dimensional epipolar data structure, as shown in block 1730. The processor 104 of the computing system 102 can execute the image manipulation application 116 to generate the depth map. The depth map can be generated using any suitable algorithm, as described above with respect to FIGS. 13-16.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
receiving, by an image manipulation application executed by a processing device, image data depicting an image space from a plurality of perspectives, wherein the image data comprises an input image having a plurality of super-pixels, each super-pixel comprising image data encoded from the plurality of perspectives;
generating, by the image manipulation application, a three-dimensional epipolar data structure from the image data, the three-dimensional epipolar data structure comprising data describing a difference in position of an object between the plurality of perspectives, wherein the three-dimensional epipolar data structure corresponds to a region of the image space, wherein the generating the three-dimensional epipolar data structure comprises:
determining first position data from a first subset of pixels of the plurality of super-pixels, wherein the first position data identifies a position of the object within a first plane representing a first dimension and a second dimension of the three-dimensional epipolar data structure, and
determining second position data from a second subset of pixels of the plurality of super-pixels, wherein the second position data identifies a position of the object within a second plane representing the second dimension and a third dimension of the three-dimensional epipolar data structure; and
generating, by the image manipulation application, a depth map based on the three-dimensional epipolar data structure.

2. The method of claim 1, wherein receiving the image data depicting the image space from the plurality of perspectives comprises:
extracting, from the plurality of super-pixels, the image data depicting the image space from the plurality of perspectives.

3. The method of claim 1, wherein generating the three-dimensional epipolar data structure comprises:
identifying the region of the image space;
generating a plurality of two-dimensional epipolar data structures, wherein each of the plurality of two-dimensional epipolar data structures corresponds to a portion of the region of the image space, wherein a first two-dimensional epipolar data structure of the plurality of two-dimensional epipolar data structures comprises data describing a first difference in position of the object along a first axis and a second two-dimensional epipolar data structure of the plurality of two-dimensional epipolar data structures comprises data describing a second difference in position of the object along a second axis; and
generating the three-dimensional epipolar data structure based on the plurality of two-dimensional epipolar data structures.

4. The method of claim 1, wherein generating the depth map based on the three-dimensional epipolar data structure comprises:
determining a function describing a relationship between two instances of the object in the three-dimensional epipolar data structure;
determining a derivative of the function; and
estimating a depth value for the object based on the derivative of the function.

5. The method of claim 1, further comprising:
generating a confidence map associated with the depth map based on the three-dimensional epipolar data structure comprises, wherein the confidence map identifies a plurality of high-confidence regions of the image space associated with a plurality depth values of the depth map generated based on the three-dimensional epipolar data structure and a plurality of low-confidence regions of the image space; and
estimating an additional plurality of depth values corresponding to the plurality of low-confidence regions, wherein each of the additional plurality of depth values is estimated based on one of the plurality depth values associated with a corresponding one of the plurality of high-confidence regions.

6. The method of claim 5, wherein estimating the additional plurality of depth values comprises, for each of the plurality of low-confidence regions:
identifying two of the plurality of high-confidence regions adjacent to the respective low confidence region from the confidence map;
averaging two depth values respectively corresponding to the two of the plurality of high-confidence regions; and
selecting the average depth value as a respective depth value for the respective low confidence region.

7. The method of claim 1, further comprising:
capturing, by an imaging device in which the processing device is disposed, the image data; and
storing, by the imaging device, the image data to a non-transitory computer-readable medium accessible by the processing device.

8. A non-transitory computer-readable medium embodying program code executable by a processing device, the non-transitory computer-readable medium comprising:
program code for receiving image data depicting an image space from a plurality of perspectives, wherein the image data comprises an input image having a plurality of super-pixels, each super-pixel comprising image data encoded from the plurality of perspectives;
program code for generating a three-dimensional epipolar data structure from the image data, the three-dimensional epipolar data structure comprising data describing a difference in position of an object between the plurality of perspectives, wherein the three-dimensional epipolar data structure corresponds to a region of the image space, wherein the generating the three-dimensional epipolar data structure comprises:
determining first position data from a first subset of pixels of the plurality of super-pixels, wherein the first position data identifies a position of the object within a first plane representing a first dimension and a second dimension of the three-dimensional epipolar data structure, and
determining second position data from a second subset of pixels of the plurality of super-pixels, wherein the second position data identifies a position of the object within a second plane representing the second dimension and a third dimension of the three-dimensional epipolar data structure; and
program code for generating a depth map based on the three-dimensional epipolar data structure.

9. The non-transitory computer-readable medium of claim 8, wherein receiving the image data depicting the image space from the plurality of perspectives comprises:
extracting, from the plurality of super-pixels, the image data depicting the image space from the plurality of perspectives.

10. The non-transitory computer-readable medium of claim 8, wherein the program code generating the three-dimensional epipolar data structure comprises:
program code for identifying the region of the image space;
program code for generating a plurality of two-dimensional epipolar data structures, wherein each of the plurality of two-dimensional epipolar data structures corresponds to a portion of the region of the image space, wherein a first two-dimensional epipolar data structure of the plurality of two-dimensional epipolar data structures comprises data describing a first difference in position of the object along a first axis and a second two-dimensional epipolar data structure of the plurality of two-dimensional epipolar data structures comprises data describing a second difference in position of the object along a second axis; and
program code for generating the three-dimensional epipolar data structure based on the plurality of two-dimensional epipolar data structures.

11. The non-transitory computer-readable medium of claim 8, wherein the program code for generating the depth map based on the three-dimensional epipolar data structure comprises:
program code for determining a function describing a relationship between two instances of the object in the three-dimensional epipolar data structure;
program code for determining a derivative of the function; and
program code for estimating a depth value for the object based on the derivative of the function.

12. The non-transitory computer-readable medium of claim 8, further comprising:
program code for generating a confidence map associated with the depth map based on the three-dimensional epipolar data structure comprises, wherein the confidence map identifies a plurality of high-confidence regions of the image space associated with a plurality depth values of the depth map generated based on the three-dimensional epipolar data structure and a plurality of low-confidence regions of the image space; and
program code for estimating an additional plurality of depth values corresponding to the plurality of low-confidence regions, wherein each of the additional plurality of depth values is estimated based on one of the plurality depth values associated with a corresponding one of the plurality of high-confidence regions.

13. The non-transitory computer-readable medium of claim 12, wherein the program code for estimating the additional plurality of depth values comprises, for each of the plurality of low-confidence regions:
program code for identifying two of the plurality of high-confidence regions adjacent to the respective low confidence region from the confidence map;
program code for averaging two depth values respectively corresponding to the two of the plurality of high-confidence regions; and
program code for selecting the average depth value as a respective depth value for the respective low confidence region.

14. A system comprising:
a processor configured to execute instructions stored in a non-transitory computer-readable medium;
wherein the instructions comprise an image manipulation application configured to perform operations comprising:
receiving image data depicting an image space from a plurality of perspectives, wherein the image data comprises an input image having a plurality of super-pixels, each super-pixel comprising image data encoded from the plurality of perspectives;
generating a three-dimensional epipolar data structure from the image data, the three-dimensional epipolar data structure comprising data describing a difference in position of an object between the plurality of perspectives, wherein the three-dimensional epipolar data structure corresponds to a region of the image space, wherein the generating the three-dimensional epipolar data structure comprises:
determining first position data from a first subset of pixels of the plurality of super-pixels, wherein the first position data identifies a position of the object within a first plane representing a first dimension and a second dimension of the three-dimensional epipolar data structure, and determining second position data from a second subset of pixels of the plurality of super-pixels, wherein the second position data identifies a position of the object within a second plane representing the second dimension and a third dimension of the three-dimensional epipolar data structure; and generating a depth map based on the three-dimensional epipolar data structure.

15. The system of claim 14, further comprising an imaging device configured to record the image data, wherein the processor is configured to receive the image data from the imaging device.

16. The system of claim 14, wherein receiving the image data depicting the image space from the plurality of perspectives comprises:

extracting, from the plurality of super-pixels, the image data depicting the image space from the plurality of perspectives.

17. The system of claim 14, wherein generating the at least one three-dimensional epipolar data structure comprises:

identifying the region of the image space;

generating a plurality of two-dimensional epipolar data structures, wherein each of the plurality of two-dimensional epipolar data structures corresponds to a portion of the region of the image space, wherein a first two-dimensional epipolar data structure of the plurality of two-dimensional epipolar data structures comprises data describing a first difference in position of the object along a first axis and a second two-dimensional epipolar data structure of the plurality of two-dimensional epipolar data structures comprises data describing a second difference in position of the object along a second axis; and generating the three-dimensional epipolar data structure based on the plurality of two-dimensional epipolar data structures.

18. The system of claim 14, wherein generating the depth map based on the three-dimensional epipolar data structure comprises:

determining a function describing a relationship between two instances of the object in the three-dimensional epipolar data structure;

determining a derivative of the function; and estimating a depth value for the object based on the derivative of the function.

19. The system of claim 14, wherein the image manipulation application is further configured to perform additional operations comprising:

generating a confidence map associated with the depth map based on the three-dimensional epipolar data structure comprises, wherein the confidence map identifies a plurality of high-confidence regions of the image space associated with a plurality depth values of the depth map generated based on the three-dimensional epipolar data structure and a plurality of low-confidence regions of the image space; and estimating an additional plurality of depth values corresponding to the plurality of low-confidence regions, wherein each of the additional plurality of depth values is estimated based on of the plurality depth values associated with a corresponding one of the plurality of high-confidence regions.

20. The system of claim 19, wherein estimating the additional plurality of depth values comprises, for each of the plurality of low-confidence regions:

identifying two of the plurality of high-confidence regions adjacent to the respective low confidence region from the confidence map;

averaging two depth values respectively corresponding to the two of the plurality of high-confidence regions; and selecting the average depth value as a respective depth value for the respective low confidence region.

* * * * *

UNITED STATES PATENT AND TRADEMARK OFFICE
CERTIFICATE OF CORRECTION

PATENT NO. : 9,240,048 B2  
APPLICATION NO. : 13/690514  
DATED : January 19, 2016  
INVENTOR(S) : Michael Wish Tao et al.

It is certified that error appears in the above-identified patent and that said Letters Patent is hereby corrected as shown below:

IN THE CLAIMS

Column 19, Claim 17, Lines 21-22

Delete "at least one"

Signed and Sealed this  
Nineteenth Day of April, 2016

Michelle K. Lee  
*Director of the United States Patent and Trademark Office*